United States Patent Office 2,874,709
Patented Feb. 24, 1959

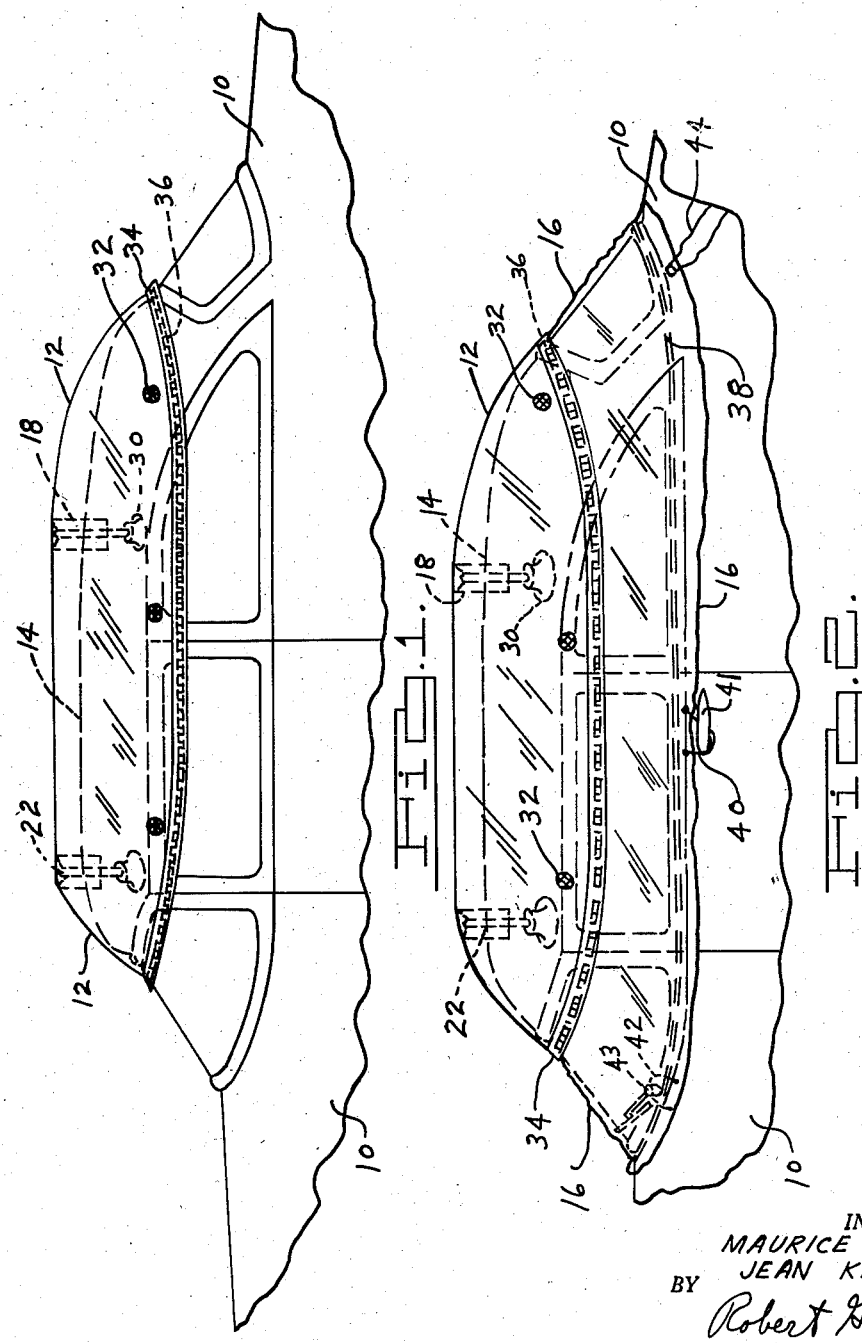

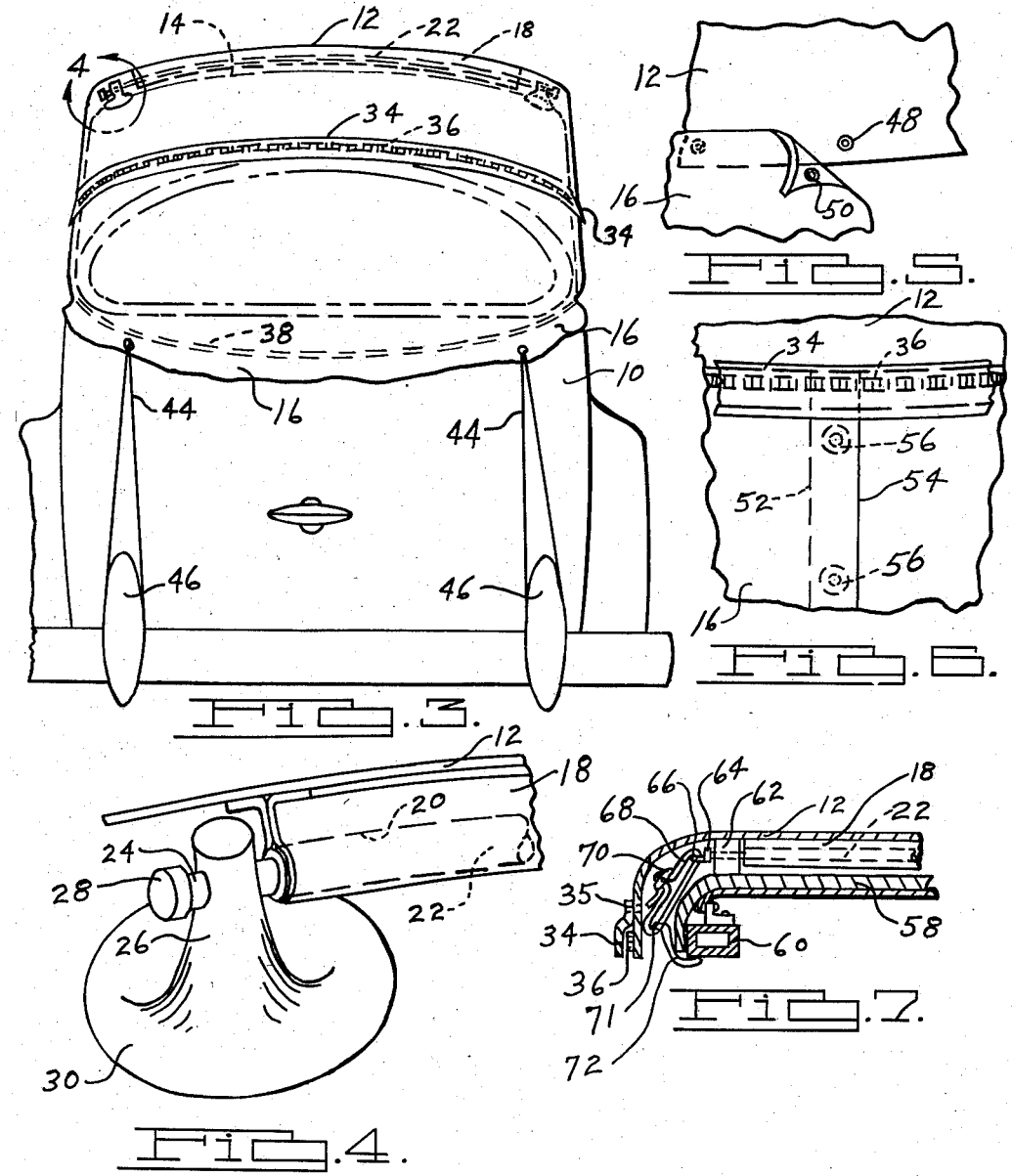

2,874,709

VEHICLE PROTECTIVE COVER

Maurice Cohen and Jean Karson, Detroit, Mich.

Application June 14, 1955, Serial No. 515,318

4 Claims. (Cl. 135—5)

This invention relates to a vehicle protective cover, and, more particularly, to a novel vehicle protective cover especially adapted to enclose and protect the top of a parked vehicle and the windows thereof, from the adverse effect of the elements, such as snow, sleet, rain and the sun, and, which cover may be quickly and easily mounted on and removed from the vehicle.

At the present time, more and more people are depending on automobiles for transportation purposes, and, such increased use of automobiles has caused an increase in outside parking facilities, whereby the automobiles so parked are subjected to the adverse effects of the elements, such as, the sun, snow, sleet, rain and the like. Accordingly, it is the primary object of this invention to provide a detachable protective cover for use on automobiles which must be parked outside in all kinds of weather.

It is an important object of this invention to provide a protective cover for a parked vehicle, comprising, a first part which is adapted to be detachably mounted on the top of the vehicle and to extend partially down the sides thereof, and, a second part which is adapted to be detachably connected to the lower periphery of said first part, and to cover the window areas of the vehicle, and, means for securing the lower edge of said second part to the vehicle.

It is another object of this invention to provide a protective cover for a parked vehicle which is formed from a plurality of easily assembled parts and which is adapted for quick application to the top and window areas of a vehicle.

It is still another object of this invention to provide a protective cover for a parked vehicle, comprising: an upper part made from a suitable flexible, light-weight material such as plastic, canvas and the like, which is shaped according to the top of the particular vehicle on which it is to be applied, and, which is adapted to be detachably secured to the vehicle; and, a lower annular part made from the same material as the upper part, and, which is secured to the upper part by means of a suitable zipper, snaps, or the like, whereby, the top and window areas of a parked vehicle may be easily and quickly covered to keep it cool in warm weather and to protect it from the adverse effect of the elements in snowy and sleety weather.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 1 is a fragmentary side elevational view of a vehicle provided with the upper part of a vehicle protective cover made in accordance with the principles of the invention;

Fig. 2 is a fragmentary side elevational view similar to Fig. 1 and showing a vehicle provided with a complete protective cover made in accordance with the principles of the invention;

Fig. 3 is a rear end elevational view of a vehicle provided with a protective cover as shown in Fig. 2;

Fig. 4 is an enlarged fragmentary perspective view of the structure illustrated in Fig. 3, taken within the circle marked 4, thereof;

Fig. 5 is an enlarged fragmentary view showing a second method for detachably connecting the lower annular part of the protective cover to the upper part;

Fig. 6 is an enlarged fragmentary view of a modified lower part for a cover made in accordance with the invention; and, Fig. 7 is an enlarged fragmentary sectional view of a convertible auto top, showing a modified means for attaching the upper part of a protective cover to the convertible top.

Before explaining in detail the present invention, it is to be understood, that the invention is not limited in its application to the details of construction and arrangement of parts illustrated in the accompanying drawings, since the invention is capable of other embodiments and of being practiced or carried out in various ways. Also, it is to be understood, that the phraseology and terminology employed herein is for the purpose of description and not limitation.

In the drawings, the numeral 10 designates a vehicle provided with a protective cover made in accordance with the principles of the invention. The protective cover comprises an upper part 12, which is adapted to be detachably anchored or secured to the top 14 of the vehicle 10, and a lower part 16 which is adapted to be detachably connected to the upper part 12, as more fully explained hereinafter.

The upper part 12 of the protective cover is formed with a convex cross section, both longitudinally and transversely, so as to extend over the top of a vehicle and partly down the sides thereof, to approximately the upper level of the windows in the vehicle. Both the upper part 12 and the lower part 16 are adapted to be made from any suitable flexible light-weight material, such as plastic, canvas, and the like. The upper part 12 may, however, be made from a suitable light-weight, non-flexible material, if desired.

The upper part 12 of the protective cover is adapted to be releasably attached or anchored to the top of a vehicle by any suitable means, but it has been found preferable to use two or more of the retaining structures shown in Fig. 4. The retaining or anchoring structures each comprise a transversely disposed sleeve, as 18, formed from the same material as the cover parts, which is provided with a longitudinal aperture 20 therethrough, in which is slideably mounted a transverse rod 22 which may be made from any suitable light-weight metal or plastic. The sleeves 18 may be attached to the upper part 12 by any suitable means, as by being sewed thereto. Each end of the transverse rods 22 is provided with a narrowed portion or neck 24, adapted to be slideably mounted in a suitable horizontal aperture in a vertical post 26. The ends of the rods 22 are enlarged, as at 28, to prevent the neck portions 24 from becoming disengaged from the posts 26. The lower ends of the posts 26 are suitably mounted on a suction cup 30, which is adapted to engage the top of the vehicle in the usual manner. The upper part 12 of the protective cover may thus be easily and quickly attached to the top of a vehicle, by means of the suction cup retaining structures shown in Fig. 4.

As is shown in Figs. 1 and 2, the upper part 12 of the protective cover may be provided with a plurality of vent holes, as 32, around the periphery thereof, and, with an annular flap 34 which is suitably attached thereto, as by means of the stitches 35. The flap 34 is adapted to overlap and protect the peripherally disposed zipper 36 from the elements. The zipper 36 is adapted to connect the lower annular part of the cover 16, easily and quickly to the upper part 12.

The lower edge of the lower annular part 16 of the protective cover is provided with a band of suitable elastic 38, which is fixedly mounted on the part 16 and is adapted to anchor the lower part 16 of the cover against the vehicle body and retain it in place. The cover lower part 16 is further provided with a plurality of elastic hold-down strings, as 40, which may be disposed around the handle 41 of the vehicle, the elastic strings 42, which may be disposed around the windshield wipers 43, and the elastic strings 44, which may be fixed around the bumper portions 46. The aforelisted elastic hold-down strings are adapted to hold the cover lower part 16 in position against adverse weather effects, as wind, swirling snow, and the like.

It will be seen from the aforegoing, that a vehicle protective cover has been provided which may be easily and quickly anchored in place on a vehicle, or be removed therefrom. The protective cover of the invention may be made from any suitable material, and, may be transparent, colored, or opaque, as desired. This novel protective cover is useful in both hot and cold climates, since it may be used to protect the vehicle from the rays of the sun and keep it cool, and, it may also be used to protect the vehicle from sleet and snow in a cold or winter-like climate.

In use, the cover upper part 12 of the protective cover would be provided with the suction cups 30 and the transverse bars 22, so that the user merely has to apply the suction cups 30 to the appropriate locations on the top of the vehicle to install it in place. The annular, one-piece lower part 16 is then connected to the upper part 12 by connecting the zipper elements on the lower part to the zipper elements on the upper part, in the usual manner. The elastic hold-down strings 40, 42 and 44 may be used under certain conditions, as desired, as on a very windy day.

Instead of using a zipper, the cover lower part 16 may be attached to the cover upper part 12, by means of suitable snaps, as 48 and 50, as illustrated in Fig. 5. As shown in Fig. 6, the lower annular part 16 may be made in a single elongated strip, with the ends 52 and 54 overlapping each other and detachably connected together by means of suitable snaps, as 56.

The novel vehicle protective cover of the present invention may be adapted for application to a vehicle of the convertible type, as illustrated in Fig. 7. The numeral 58 represents the usual convertible top, which is suitably connected to a side rail 60. In order to hold the cover upper part 12 on the usual soft convertible top 58, each end of the transverse rods 22 are suitably mounted in a block-like member 62, which is adapted to sit on the top surface of the convertible cover 58, near the edge thereof. In this case, the outer ends 64 of the rods 22 have suitably affixed thereto, an eye member 66, through which is slideably mounted a strap 68 which is joined to an adjusting buckle 70. An eye bolt 71 is slideably mounted on the lower part of the strap 68, and, carries on the lower end thereof a hook 72, which is adapted to abut against and grip the lower edge of the convertible roof side rail 60. It will be seen, that the straps 68 may be adjusted to put a tension thereon, so as to put a downwardly directed pressure on the blocks 62, and, hold them in place on the convertible top 58.

It will be appreciated, that the cover lower part 16 may be made longer, if desired, so as to extend downwardly to cover the entire side areas of a vehicle, and to extend forwardly and rearwardly to cover the hood and trunk areas, respectively.

While it will be apparent, that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A vehicle protective cover of the class described, for use on vehicles having a roofed passenger compartment provided with window areas comprising: a first unitary cover part of pliable material formed to cover the roof of the vehicle; means carried by said first cover part for detachably anchoring said first cover part to the roof of the vehicle in a spaced relationship therewith; a second unitary cover part of pliable material formed to cover the window areas of the vehicle; and, means for detachably connecting said second cover part to said first cover part.

2. A vehicle protective cover of the class described, for use on vehicles having a roofed passenger compartment provided with window areas comprising: a first unitary cover part of pliable material formed to cover the roof of the vehicle; means carried by said first cover part for detachably anchoring said first cover part to the roof of the vehicle in a spaced relationship therewith; a second unitary cover part of pliable material formed to cover the window areas of the vehicle; means for detachably connecting said second cover part to the lower periphery of said first cover part; and, means for detachably connecting the second cover part to said vehicle.

3. A vehicle protective cover of the class described, for use on vehicles having a roofed passenger compartment provided with window areas comprising: a first cover part of pliable material formed to cover the roof of the passenger compartment of a vehicle; a plurality of transverse sleeves mounted on the inner surface of said first cover part; a rod mounted in each of said sleeves; a supporting means mounted on the ends of the rods in said sleeves and adapted to detachably anchor said cover first part on the roof of a vehicle; a second cover part of pliable material formed to cover the window areas of the vehicle; and means for detachably connecting the second cover part to said first cover part.

4. A vehicle protective cover of the class described, for use on vehicles having a roofed passenger compartment provided with window areas comprising: a first unitary cover part of pliable material formed to cover the roof of the vehicle; means carried by said first cover part for detachably anchoring said first cover part to the roof of the vehicle in a spaced relationship therewith; a second unitary cover part of pliable material formed to cover the window areas of the vehicle; means for detachably connecting said second cover part to the lower periphery of said first cover part; an elastic band mounted on the lower edge of said second cover part for holding said second cover part against the vehicle; and, resilient means mounted on said second cover part for detachable connection to the vehicle, for holding-down the lower edge of said second cover part.

References Cited in the file of this patent

UNITED STATES PATENTS

| | | |
|---|---|---|
| 574,091 | Irvine | Dec. 29, 1896 |
| 656,033 | Miller | Aug. 14, 1900 |
| 1,257,206 | Fernbach | Feb. 19, 1918 |
| 1,858,739 | Hofrichter | May 17, 1932 |
| 2,222,636 | Strauss | Nov. 26, 1940 |
| 2,248,655 | Bila | July 8, 1941 |
| 2,279,812 | Bartlett | Apr. 14, 1942 |
| 2,609,042 | Chamberlain | Sept. 2, 1952 |
| 2,666,840 | Poirier | Jan. 19, 1954 |
| 2,718,912 | Zimmerman | Sept. 27, 1955 |

FOREIGN PATENTS

| | | |
|---|---|---|
| 513,435 | Great Britain | Oct. 12, 1939 |